US011201963B2

(12) United States Patent
French et al.

(10) Patent No.: US 11,201,963 B2
(45) Date of Patent: Dec. 14, 2021

(54) PRIORITIZATION OF ELECTRONIC COMMUNICATIONS

(71) Applicant: eHealth, Inc., Mountain View, CA (US)

(72) Inventors: Yvonne French, Mountain View, CA (US); Nicholas Jost, Mountain View, CA (US); Michael Tadlock, Mountain View, CA (US); Qingxin Yu, Mountain View, CA (US)

(73) Assignee: eHealth, Inc., Mountain View, CA (US)

( * ) Notice: Subject to any disclaimer, the term of this patent is extended or adjusted under 35 U.S.C. 154(b) by 770 days.

(21) Appl. No.: 15/202,970

(22) Filed: Jul. 6, 2016

(65) Prior Publication Data

US 2018/0012136 A1 Jan. 11, 2018

(51) Int. Cl.

| | |
|---|---|
| ***G06N 20/20*** | (2019.01) |
| ***H04M 3/42*** | (2006.01) |
| ***G06N 20/00*** | (2019.01) |
| ***H04M 3/523*** | (2006.01) |
| ***G06N 5/00*** | (2006.01) |
| *G06N 20/10* | (2019.01) |

(52) U.S. Cl.

CPC ........ *H04M 3/42059* (2013.01); *G06N 5/003* (2013.01); *G06N 20/00* (2019.01); *G06N 20/20* (2019.01); *H04M 3/5238* (2013.01); *G06N 20/10* (2019.01); *H04M 2203/555* (2013.01)

(58) Field of Classification Search

CPC ... G06N 7/005; G06N 20/00; H04M 3/42059; H04M 3/5238; H04M 2203/555

See application file for complete search history.

(56) References Cited

U.S. PATENT DOCUMENTS

| | | | | |
|---|---|---|---|---|
| 5,937,205 A * | 8/1999 | Mattson | G06F 13/1642 | 710/6 |
| 6,560,330 B2 * | 5/2003 | Gabriel | H04M 3/523 | 379/265.01 |
| 8,095,613 B1 * | 1/2012 | Perkowitz | G06Q 10/109 | 709/207 |
| 8,510,389 B1 * | 8/2013 | Gurajada | G06Q 30/02 | 709/205 |
| 8,738,611 B1 * | 5/2014 | Zarmer | G06Q 10/107 | 707/723 |
| 8,799,096 B1 * | 8/2014 | Dillon | G06Q 30/02 | 705/26.1 |
| 9,256,862 B2 * | 2/2016 | Lai | G06Q 10/107 | |
| 9,432,519 B1 * | 8/2016 | Liu | H04M 15/56 | |
| 10,511,560 B2 * | 12/2019 | Kursun | H04L 51/26 | |
| 2002/0107712 A1 * | 8/2002 | Lam | G06Q 10/063 | 705/7.11 |
| 2003/0212544 A1 * | 11/2003 | Acero | G06F 17/241 | 704/9 |

(Continued)

*Primary Examiner* — Alexey Shmatov
*Assistant Examiner* — Tri T Nguyen
(74) *Attorney, Agent, or Firm* — Schwegman Lundberg & Woessner, P.A.

(57) ABSTRACT

Methods, systems, and apparatus for prioritizing communications are described. Metadata that characterizes an electronic communication is obtained and a machine learning algorithm is applied to the metadata to generate a scoring model. A score for the electronic communication is generated based on the scoring model.

57 Claims, 10 Drawing Sheets

(56) References Cited

U.S. PATENT DOCUMENTS

| | | | | | |
|---|---|---|---|---|---|
| 2004/0057570 | A1* | 3/2004 | Power | H04M 3/5232 | 379/265.13 |
| 2008/0126951 | A1* | 5/2008 | Sood | G06Q 10/107 | 715/752 |
| 2011/0252043 | A1* | 10/2011 | Webb-Johnson | H04L 51/12 | 707/748 |
| 2012/0078766 | A1* | 3/2012 | Rose | G06Q 40/00 | 705/35 |
| 2013/0288722 | A1* | 10/2013 | Ramanujam | H04L 51/26 | 455/466 |
| 2014/0044246 | A1* | 2/2014 | Klemm | H04M 3/42068 | 379/93.01 |
| 2014/0079192 | A1* | 3/2014 | Amerling | H04W 4/90 | 379/45 |
| 2014/0218391 | A1* | 8/2014 | McConnell | G06F 3/04817 | 345/619 |
| 2014/0314215 | A1* | 10/2014 | Duva | G06Q 30/0202 | 379/88.01 |
| 2015/0100528 | A1* | 4/2015 | Danson | G06N 5/04 | 706/21 |
| 2015/0178749 | A1* | 6/2015 | Meng | G06Q 30/0203 | 705/7.31 |
| 2015/0278341 | A1* | 10/2015 | Shen | G06Q 30/0277 | 707/730 |
| 2016/0036973 | A1* | 2/2016 | Harasimiuk | H04L 51/32 | 379/265.13 |
| 2016/0078142 | A1* | 3/2016 | Gorny | G06Q 30/01 | 707/748 |
| 2016/0323449 | A1* | 11/2016 | Drotos | H04M 3/5166 | |
| 2017/0134329 | A1* | 5/2017 | Edgar | H04L 51/22 | |

* cited by examiner 600 604 608 612 616 620 624

```
{
    "products": [{
        "productName": "foo",
        "NTV": 300.00,
        "NPANXX": {
            "values": {
                "209": 0.3,
                "308": 0.4,
                "unknown": 0.35
            }
        },
        "allianceID": {
            "values": {
                "6541": 0.6,
                "7854": 0.8,
                "unknown": 0.5
            }
        },
        "NPANXX-allianceID": {
            "values": {
                "209-6541": 0.3-0.6,
                "308-7854": 0.4-0.8,
                "unknown-unknown": 0.35-0.5
            }
        }
    }, {
        "productName": "bar",
        "NTV": 300,
        "NPANXX": {
            "values": {
                "209": 0.3,
                "308": 0.4,
                "unknown": 0.35
            }
        },
```

*FIG. 6A*

```
"allianceID": {
            "values": {
                "6541": 0.6,
                "7854": 0.8,
                "unknown": 0.5
            }
        },
        "NPANXX-allianceID": {
            "values": {
                "209-6541": 0.3-0.6,
                "308-7854": 0.4-0.8,
                "unknown-unknown": 0.35-0.5
            }
        }
628 }]
    "costOfAcquisition": {
        "DNISCosts": {
            "DNIS GOES HERE": "45.00"
        }
632 },
    "detailedNTV": {
        "foo": {
            "209": "500.00",
            "308": "300.00"
        },
636         },
    "alternateScore": {
        "cisco": {
            "majorMedical": {
                "1": {
                    "high": "max",
                    "low": "400"
                }
            }
        }
640 },
    "modelVersion": "model_1"
}
```

FIG. 6B

PRIORITIZATION OF ELECTRONIC COMMUNICATIONS

TECHNICAL FIELD

Embodiments of the present disclosure relate generally to performing processing of electronic communications and, more particularly, to prioritizing electronic communications for providing customer service.

BACKGROUND

Consumers often request information on products and services, such as health insurance, using electronic communications, such as telephone calls, electronic mail, text messages, and the like. A consumer may contact insurers, manufacturers, retailers, service providers, and the like via electronic devices, such as a personal computer (PC), a tablet computer, a mobile phone, a telephone, a personal digital assistant (PDA), and the like. Often, consumer communications exceed a capacity of the customer service system to process the requests and the communications must be queued for future service. Depending on the queue length, consumers may lose interest and may terminate the communication process prior to receiving service and completing a transaction. The insurers, manufacturers, retailers, service providers, and the like may thereby forfeit potential customers, transactions, revenue, and profit.

BRIEF DESCRIPTION OF THE DRAWINGS

Some embodiments are illustrated by way of example and not limitation in the figures of the accompanying drawings, in which:

FIGS. 6A and 6B are a representation of an example data file for specifying parameters of a scoring model, in accordance with an example embodiment;

DETAILED DESCRIPTION

Figure 1:
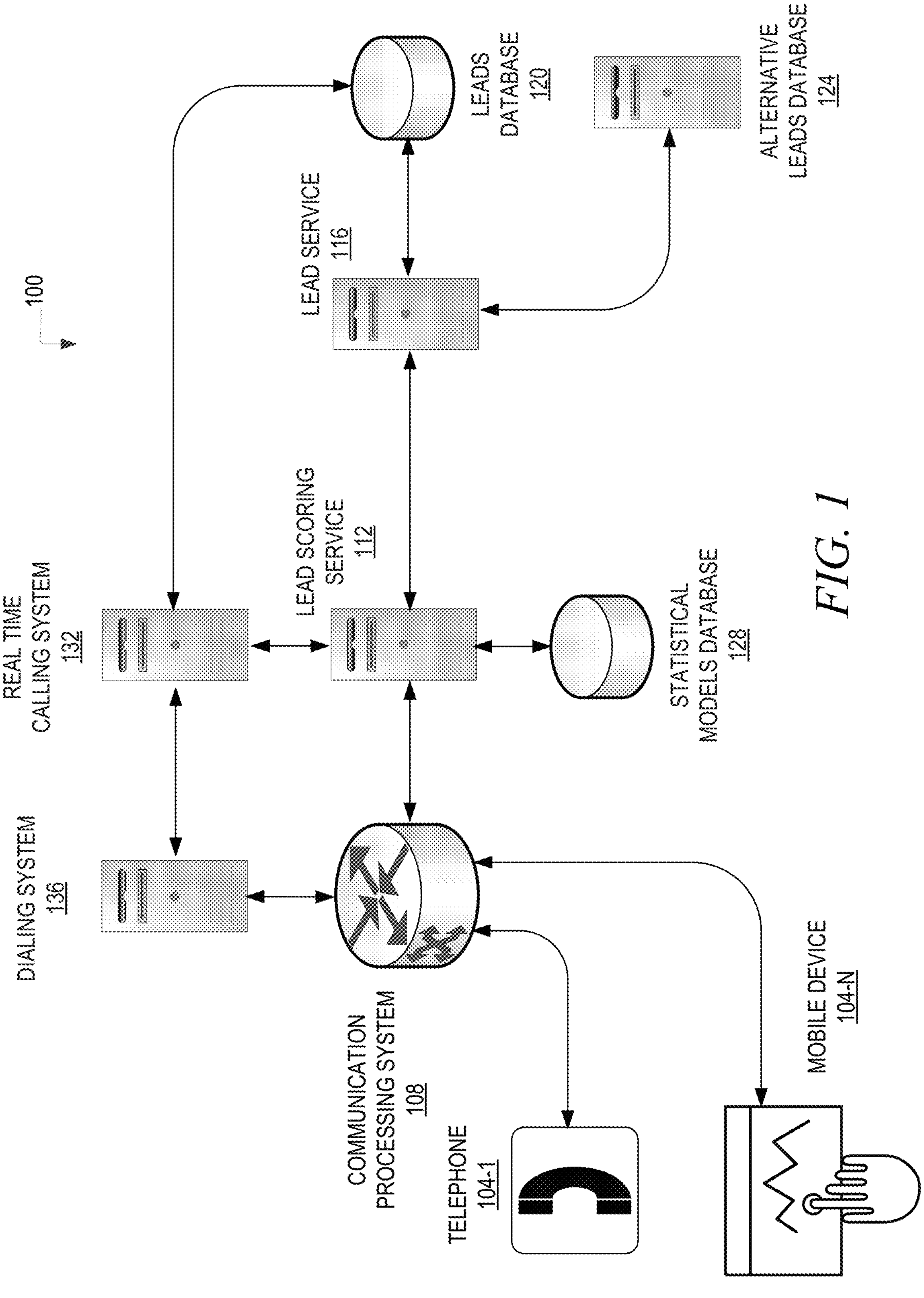
FIG. 1 is a block diagram of an example electronic communication system for prioritizing communications, in accordance with an example embodiment.

In the following detailed description of example embodiments, reference is made to specific examples by way of drawings and illustrations. These examples are described in sufficient detail to enable those skilled in the art to practice these example embodiments, and serve to illustrate how the invention may be applied to various purposes or embodiments. Other embodiments exist and are within the scope of the present application, and logical, mechanical, electrical, and other changes may be made without departing from the scope or extent of the present application. Features or limitations of various embodiments of the invention described herein, however essential to the example embodiments in which they are incorporated, do not limit the invention as a whole, and any reference to the invention, its elements, operation, and application, does not limit the invention as a whole but serves only to define these example embodiments. The following detailed description does not, therefore, limit the scope of the invention, which is defined only by the appended claims.

Overview

Generally, methods, systems, and apparatus for prioritizing electronic communications are described. Incoming communications, such as telephone calls, electronic mail, text messages, and the like, are routed, queued, or both based on a priority mechanism. The communications may be ranked based on statistical analysis on, for example, a perceived importance or value of the user associated with the communication. The communication may be inserted into the queue according to the ranking. The communications may be prioritized based on analysis of different metrics or combinations of metrics, such as revenue, profit, transaction volume, transaction volume of a specified product type, a propensity to purchase, and the like.

In one example embodiment, the system recognizes combinations of statistical features such as an originating telephone number, a location associated with the telephone number, and advertising channels that have a strong correlation with a propensity of a user to execute a purchase. The location, such as a city, county, and the like, may be determined from the originating telephone number. The advertising channel may be determined from, for example, the dialed telephone number. For example, historic data may show that certain locations, such as locations defined by a county, zip code area, and the like, when used in conjunction with other factors, may be used to identify customers who are more likely to complete a transaction and purchase health insurance. A caller identifier, such as a telephone number, internet protocol (IP) address, and the like, may be used to map the communication to a location, and the identified location may be used as a component to calculate a score used to prioritize the call. The parameters available at execution time for calculating the score may be configured by a user, consistent with applicable law. The location may be: the location where the user of the telephone, the owner of the telephone, or both resides; the location where the user of the telephone, the owner of the telephone, or both is located at the time the communication is sent and the like. In one example embodiment, the communication is ranked based on the location in combination with other characteristics of the communication, as described more fully below.

In one example embodiment, an identifier of a recipient of the communication, such as a telephone number called, can be used as one input to determine the priority given to a telephone call. For example, each of a plurality of marketing programs (such as a marketing program dedicated to a particular product or service, or a particular set of products or services) may be assigned a particular phone number. The product or service may be advertised using the assigned telephone number. A received call may then be prioritized based on statistically analyzed outcomes of a call made from that telephone number in relation to other characteristics of the communication.

In one example embodiment, a communication may be prioritized based on a recipient identifier in combination with other prioritization techniques, such as in combination with a location of a user. The parameters available at execution time to prioritize the communication may be configured by a user, consistent with applicable law. Similarly, received electronic mail, text messages, and other communications may be prioritized based on the recipient's email address, the recipient's telephone number, the caller's predicted age, a last time called, a time of day called, a time of year called, an age of the consumer, a relationship of the caller to the end consumer, a device used to call, an agent being called, an amount of average talk time for this customer, a number of previous calls from this customer, a time since last contact with this customer, a phase of the moon, a current weather/climate, current political events, current news items, a population density of the consumer's region, a family size, a web visit history, the relationship from the current date to the expected enrollment period, statements about a desire to buy (given to the communication system via a client device), Medicare eligibility, hospital and clinical care new construction projects within a given radius of the user's home, frequent commuter status, an employer-sponsored retirement plan, employer-sponsored health care, and the like.

In one example embodiment, each communication is assigned a score to be used in prioritizing (ranking) the communication. The score may be based, for example, on an estimated anticipated revenue of a customer associated with the communication, an estimated propensity of the customer associated with the communication to execute a transaction, an estimated profit margin of the customer associated with the communication, and the like. The score may be generated by training a model using historic data that characterizes communications which satisfied the optimization criteria. For example, characteristics of a communication that are shown to be able to identify those users likely to lead to a completed transaction may be used to create a model and to prioritize a new communication. The characteristics (features) of an incoming communication may then be used by the model to generate a score for the incoming communication. The score may be based on a combination of parameters and metrics, as described more fully below. For example, the estimated revenue for a user may be multiplied by the estimated propensity of the user to execute a transaction in order to generate the score. In another example, the estimated profit for a user may be multiplied by the estimated propensity of the user to execute a transaction in order to generate the score. This final score can be adjusted to account for cost of acquisition, partner goodwill, and the like. For example, the cost of acquisition of a product or service may be subtracted from the generated score to generate the final score (also known as the aggregated near-term value (NTV) of the product or service).

In one example embodiment, existing leads may be prioritized to be the subject of marketing and sales activities using a similar scoring model. The parameters available at execution time for prioritizing the leads may be configured by a user, consistent with applicable law. The generated scores may be used to prioritize outgoing communications to the businesses, consumers, and the like that are associated with each lead.

FIG. 1 is a block diagram of an example electronic communication system 100 for prioritizing communications, in accordance with an example embodiment. In one example embodiment, the electronic communication system 100 comprises user devices 104-1, . . . 104-N (collectively known as user devices 104 hereinafter), a communication processing system 108, a lead scoring service 112, a lead service 116, a leads database 120, an alternative leads database 124, a statistical models database 128, a real time calling system 132, and a dialing system 136.

Each user device 104 may be a personal computer (PC), a tablet computer, a mobile phone, a telephone, a personal digital assistant (PDA), a wearable computing device (e.g., a smartwatch), or any other appropriate computer device. User device 104 may include a user interface module, described more fully below by way of example in conjunction with FIG. 6B. In one example embodiment, the user interface module may include a web browser program and/or an application, such as a mobile application, an electronic mail application, and the like. The user device 104 may be used by a user, such as a customer, to initiate communications to obtain information, quotes, and the like regarding a product or service, such as a health insurance policy. Although a detailed description is only illustrated for the user device 104, it is noted that other user devices may have corresponding elements with the same functionality.

The user device 104 may receive a query for information from a user via an input device such as a keyboard, touchscreen, microphone, mouse, electronic pen, and the like. An electronic communication, such as a telephone call, electronic mail, text message, and the like, may be issued by the user device 104. The electronic communication may be a request for information, such as a quote for health insurance.

The network may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, another type of network, a network of interconnected networks, a combination of two or more such networks, and the like.

A communication processing system 108 receives incoming communications and prioritizes the communications for processing. The communication processing system 108 may process telephone calls, electronic mail, text messages, and the like. In one example embodiment, the communication processing system 108 is an interactive voice response system for handling telephone calls, such the unified Internet Protocol (IP) interactive voice response (IVR) product manufactured by Cisco Systems® of San Jose, Calif., USA. In one example embodiment, the communication processing system 108 maintains a queue of electronic communications, such as a queue of telephone calls, and prioritizes new calls within the queue based on a specified score. In one example embodiment, the communication processing system 108 maintains a set of marketing leads. The marketing leads may be sold to a third party, consistent with applicable law.

The lead scoring service 112 generates a score for each communication based on metadata associated with the communication. The metadata available at execution time to generate the score may be configured by a user, consistent with applicable law. Example metadata includes a telephone number of the caller (i.e., a telephone number called from), an IP address associated with the user (e.g., an IP address of a device used by the user to send the communication), a telephone number of the recipient (i.e., a telephone number called), a recipient email address, a health plan type, health plan eligibility information for the user, the zip code of the user, a county associated with the user, a predicted age of the user, a time of day called, a time of year called, an age of the consumer, a device used to call, an agent being called, a relationship from the current date to the expected enrollment period, statements about a desire to buy (given to the communication system via a client device), Medicare eligibility, a frequent commuter status, an employer sponsored retirement plan, employer sponsored health care, and the like. The lead scoring service 112 generates the score based on a scoring model that is retrieved from the statistical models database 130. The model may be a logistic regression model, a linear regression model, a random forest model, and the like. The score may be a quick score or a comprehensive score based, for example, on the type of electronic communication, as described more fully below by way of example in conjunction with FIG. 5. The lead scoring service 112 may be implemented by the apparatus of FIG. 3A, as described more fully below.

The lead service 116 manages leads acquired by the electronic communication system 100. The lead service 116 identifies leads associated with communications in response to a request from the lead scoring service 112 and returns information associated with the lead to the lead scoring service 112. The lead service 116 stores acquired leads in a leads database 120. As new leads or new information for an existing lead are determined, the corresponding new lead may be added to the leads database 120 or the existing lead may be revised to incorporate the new information. The leads database 120 may be implemented by a database management system provided by the Oracle® Corporation of Redwood City, Calif., USA.

The alternative leads database 124 maintains additional lead information that may not be covered in the leads database 120 and allows for a fuller set of metadata to be scored. The alternative leads database 120 may be implemented by a database management system provided by the Oracle® Corporation of Redwood City, Calif., USA.

The real time calling system 132 accesses leads from the leads database 120 and obtains a score for each accessed lead from the lead scoring service 112. In one example embodiment, the scores are generated for a lead based on the example metadata described above. The real time calling system 132 generates, for example, a lead text file that includes the score for each lead, the name and telephone number corresponding to the lead, and the like. The lead text file may be used by the dialing system 136 to dial a telephone call on behalf of a customer service agent (human or machine).

The dialing system 136 selects a lead from, for example, the lead text file generated by the real time calling system 132 (based on the corresponding score) and initiates an outgoing telephone call via the communication processing system 108 to the telephone number associated with the lead. The outgoing call may be placed on behalf of a human or machine agent who may be joined to the telephone call by the communication processing system 108. The communication processing system 108 may also provide lead information to the human agent, such as by whispering the name and other information associated with the lead to the human agent.

Figure 2:
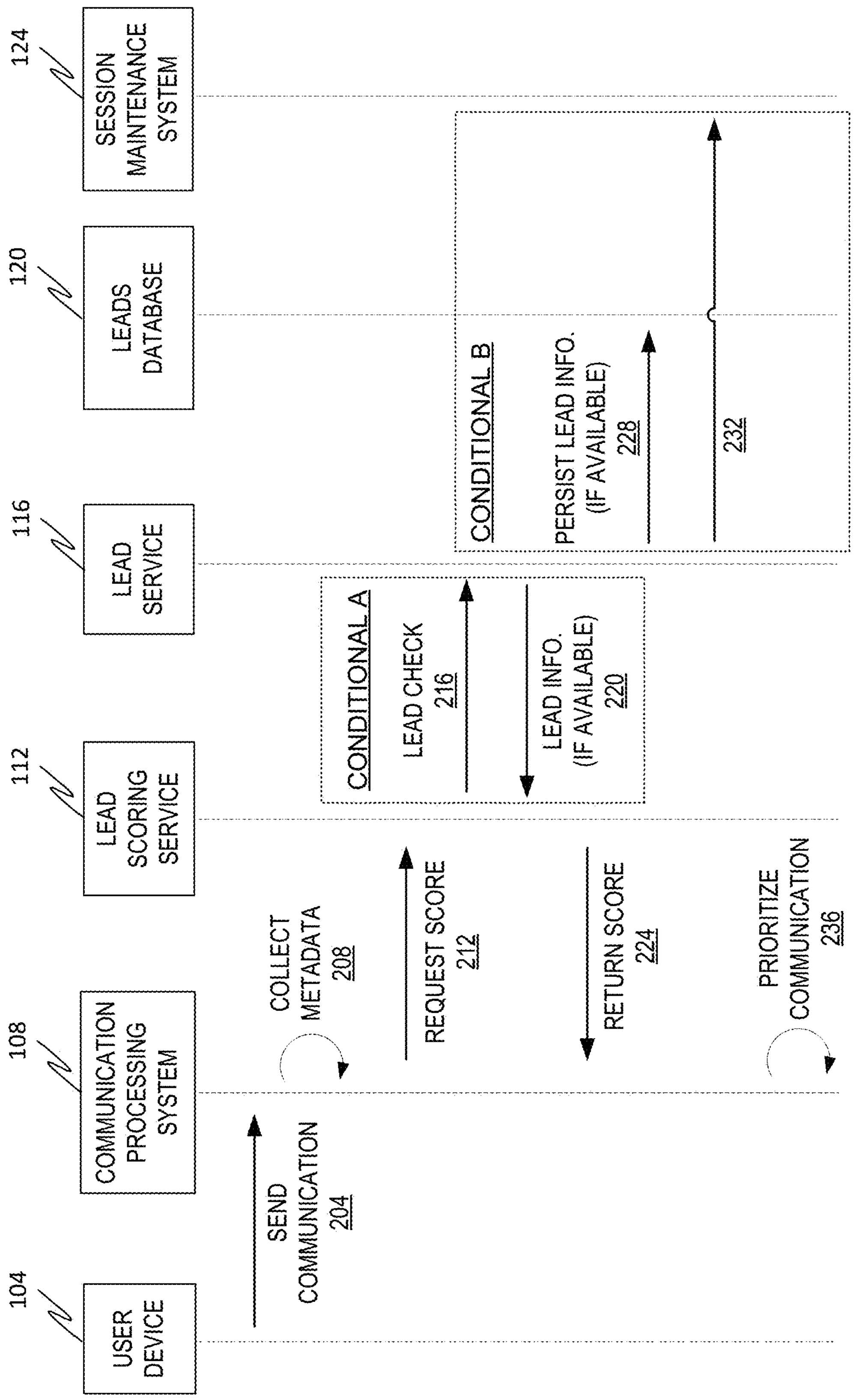
FIG. 2 is an example dataflow diagram for processing and prioritizing electronic communications, in accordance with an example embodiment.

FIG. 2 is an example dataflow diagram for processing and prioritizing electronic communications, in accordance with an example embodiment. In one example embodiment, a user, such as a customer, uses the user device 104 to contact an entity to, for example, enquire about the availability of health insurance (operation 204). The communication may be in the form of a telephone call, electronic mail, text message, and the like. The communication is received by the communication processing system 108, which collects metadata regarding the communication (operation 208). The metadata to be collected at execution time may be configured by a user, consistent with applicable law. The metadata may include a telephone number of the caller (e.g., a telephone number called from), an IP address associated with the user (e.g., an IP address of a device used by the user to send the communication), a telephone number of the recipient (i.e., a telephone number called), a recipient email address, a health plan type, health plan eligibility information for the user, the zip code of the user, a county associated with the user, and the like.

In one example embodiment, the health plan type may be inferred from the phone number called, from the electronic mail address of the recipient of the communication, from responses to an interactive voice response (IVR) system, and the like. As described above, the zip code and county of the user may be inferred from the telephone number of the caller (such as the area code and the prefix of the telephone number called from), the IP address associated with the user, and the like. The health plan eligibility information may be determined by applying speech recognition to the user's verbal responses, using an interactive voice response technique, from previous questions asked by an agent to a user, by previous questions asked on a web form, from previous observed user behavior, and the like.

In one example embodiment, the communication, such as a telephone call, is processed and ordered in a queue by the communication processing system 108. Functions, such as the determination of the location of the user, may be performed by the communication processing system 108 or the lead scoring service 112.

A request for a priority score is submitted to the lead scoring service 112 (operation 212). The priority score will be used by the communication processing system 108 to prioritize the communication in a communication queue. The request includes a portion of the metadata collected by, for example, the communication processing system 108.

The priority score request may indicate a type of score to be generated, such as a quick score or a comprehensive score. As the names imply, a quick score may be generated more quickly than a comprehensive score. The quick score may be used when time is of the essence. For example, if the communication was received via a telephone, the response time may be important and a quick score may be used. If the communication was received via electronic mail, the response time may be less important and a comprehensive score may be used. A quick score may also be used in situations where the lead scoring service 112 is running near full capacity; the generation of a quick score may reduce the processing demands on the lead scoring service 112. The decision on whether to generate a quick score or a comprehensive score may be made by the communication processing system 108 or the lead scoring service 112.

If a comprehensive score is requested, the lead scoring service 112 submits a request to the lead service 116 to determine if an existing lead has been recorded for the user associated with the communication (operation 216). The request includes information regarding the user which may be used to identify the user, identify a lead associated with the user, or both. The information included in the request at execution time may be configured by a user, consistent with applicable law. The information may include the telephone number called from, the user's social security number, the user's location, the user's age, the user's responses to an IVR system, and the like. The lead service 116 determines whether the user can be identified, whether a lead associated with the user exists, or both. If a lead associated with the user has been found, the lead information corresponding to the user, or a portion of the lead information corresponding to the user, is returned to the lead scoring service 112 (operation 220).

The lead scoring service 112 computes the score for the corresponding communication and returns the score to the communication processing system 108, as described more fully below by way of example in conjunction with FIG. 5 (operation 224). If the score is a comprehensive score, the score may be based on a portion of the lead information, if such information was returned by the lead service 116.

The communication processing system 108 prioritizes (i.e., orders) the corresponding communication with other communications in a queue for processing (operation 236). In one example embodiment, the communication processing system 108 prioritizes (i.e., orders) the corresponding communication with other communications in one of a plurality of queues. Each queue may be associated with a different region of the country, a different product or service, a different priority level, and the like.

In one example embodiment, if the communication is associated with a new lead or if new information on an existing lead has been determined, the lead service 116 stores the lead information or other metadata related to the user in the leads database 120 (operation 228). For example, the lead service 116 may store metadata related to the user in a database provided by the Oracle Corporation of Redwood. City, Calif., USA. The data may also be stored in the alternative leads database 124 (operation 232). Both operations 228 and 232 will be completed after, and will not impact the return of, the score in operation 224.

Figure 3A:
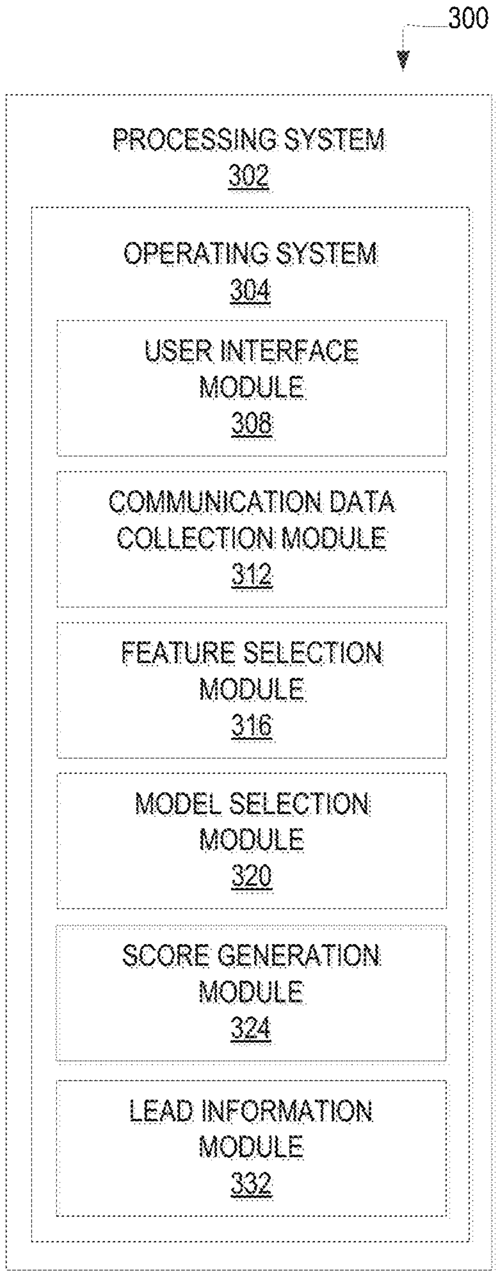
FIG. 3A is a block diagram of an example apparatus for generating a score for prioritizing electronic communications, in accordance with an example embodiment.

FIG. 3A is a block diagram of an example apparatus 300 for generating a score for prioritizing electronic communications, in accordance with an example embodiment. The apparatus 300 is shown to include a processing system 302 that may be implemented on a client or other processing device, and that includes an operating system 304 for executing software instructions. The apparatus 300 may be used to implement the lead scoring service 112.

In accordance with an example embodiment, the apparatus 300 may include a user interface module 308, a communication data collection module 312, a feature selection module 316, a model selection module 320, a score generation module 324, and a lead information module 332.

The user interface module 308 enables a user to, for example, configure the communication data collection module 312, the feature selection module 316, the model selection module 320, and the score generation module 324.

The communication data collection module 312 collects metadata related to an electronic communication, as described more fully below. The collected data may be received from the communication processing system 108.

The feature selection module 316 enables the features of the model to be selected. The features are selected from a defined universe of features. Features may be added to or deleted from the universe of features by a user, consistent with applicable law, as described more fully below by way of example. The universe of features may include a broad array of characteristics of a communication. Example features include, but are not limited to:

Internal customer data
- a. Customer resource management (CRM) system information
  - i. Time of user profile creation
  - ii. User age
  - iii. User's zip code
  - iv. User contact history
    - 1. Count of days since last contact
    - 2. Current step in the application process
    - 3. Average user call time
    - 4. Abandoned calls
    - 5. Disconnected calls (such as due to technical problems)
- b. Contact instance based
  - i. Phone call
    - 1. Timestamp
      - a. Time of day
      - b. Day of week
      - c. Month
      - d. Enrollment period
    - 2. Agent name
    - 3. Talk time
    - 4. Caller phone number
    - 5. Answer to IVR questions
  - ii. Web visit
    - 1. Time of day
    - 2. Device identifier
    - 3. Length of visit
    - 4. Page depth visited
- c. Other External data
- d. Health insurance industry specific information
  - i. Medicare eligibility by county
- e. Demographic
  - i. Population density per zip code
- f. External customer-specific data
  - i. Reverse look-up of customer phone number
    - 1. Family size
    - 2. Occupation
  - ii. Other personally identifiable data The model selection module 320 obtains a predefined scoring model generated using a machine learning technique, such as a linear model, a logistic model, a random forest model, and the like. In one example embodiment, the model is used to predict the revenue of a communication based on the probability of a user purchasing a given product where the probability is generated using a logistic model that was created using logistic regressions. A logistic model is a type of classification model based on probabilistic statistics and can be used to predict a category of a dependent variable (i.e., a feature), such as a probability that a customer enquiry results in a completed transaction, based on one or more independent variables (i.e., features). The categories may be binary, such as a transaction that is executed or a transaction that is not executed. In one example embodiment, a logistic model is used to predict the probability of the dependent feature being in a particular category (such as the probability of the transaction being executed). In one example, the dependent variable may categorize a customer enquiry into categories such as "expected revenue exceeds a revenue threshold" and "expected revenue does not exceed the revenue threshold." The categories may indicate the probability of the "expected revenue" of the customer enquiry exceeding the revenue threshold.

Logistic regression measures the relationship between the categorical dependent variable and one or more independent variables by estimating probabilities using a logistic function, which is the cumulative logistic distribution.

In one example embodiment, training data (e.g., historical data) for the model may not be comprehensive. For example, a new product or service may become available that is not sufficiently characterized by the training data. In this case, the model may erroneously rank the new product or service, or may be unable to rank the new product or service. For example, the model may simply rank the new product or service at the bottom of the ranking queue. In one example embodiment, the new product or service is processed using a special handling technique. The special handling technique may be configured to rank the new product or service toward the aggregate mean of the model. In this case, a special handling technique is proposed, such as the inclusion of an additional term for the linear function that is only applied to processing communications corresponding to the new product or service. In one example embodiment, the additional term is set equal to the median of all the coefficients for the corresponding input variable (e.g., the corresponding product, service, advertising channel, and the like). Regressions are then run on the training data using the revised linear function. If the communications corresponding to the new product or service are ranked near the aggregate mean of the model (such as within a predefined threshold of the aggregate mean), the special handling technique is accepted; otherwise, a modified special handling technique is proposed and the regression test is repeated.

In one example embodiment, if sufficient training data is not available for a particular product, service, advertising channel, and the like (i.e., only sparse training data is available), the training data for the particular product, service, or advertising channel can be combined with training data for one or more other products, services, or advertising channels. In one example embodiment, the training data for the particular product, service, or advertising channel can be combined with training data for one or more other products, services, or advertising channels (regardless of the amount of training data). A model can be created using the combined training data and the resulting model can be used for generating a score for each of the products, services, or advertising channels. As used herein, an advertising channel is a method of communicating the value of a product to a consumer.

The score generation module 324 implements the scoring functionality of the lead scoring service 112 using the generated model. The score generation module 324 may determine the type of score, such as a quick score, a comprehensive score, and the like. The type of score may be based on the type of electronic communication. For example, a quick score may be selected for a telephone call and a comprehensive score may be selected for electronic mail.

The lead information module 332 submits requests to the lead service 116 to determine if an existing lead has been recorded for the user associated with the communication. The request includes information regarding the user that may be used to identify the user, identify a lead associated with the user, or both. The information included in the request at execution time may be configured by a user, consistent with applicable law. The information may include the caller's telephone number, the user's social security number, the user's location, the user's age, and the like. The lead information module 332 processes the lead information, or a portion of the lead information, returned from the lead service 116. For example, the lead information module 332 may parse the lead information, extract portions of the lead information to be utilized by the score generation module 324, and format the lead information for use by the score generation module 324.

Figure 3B:
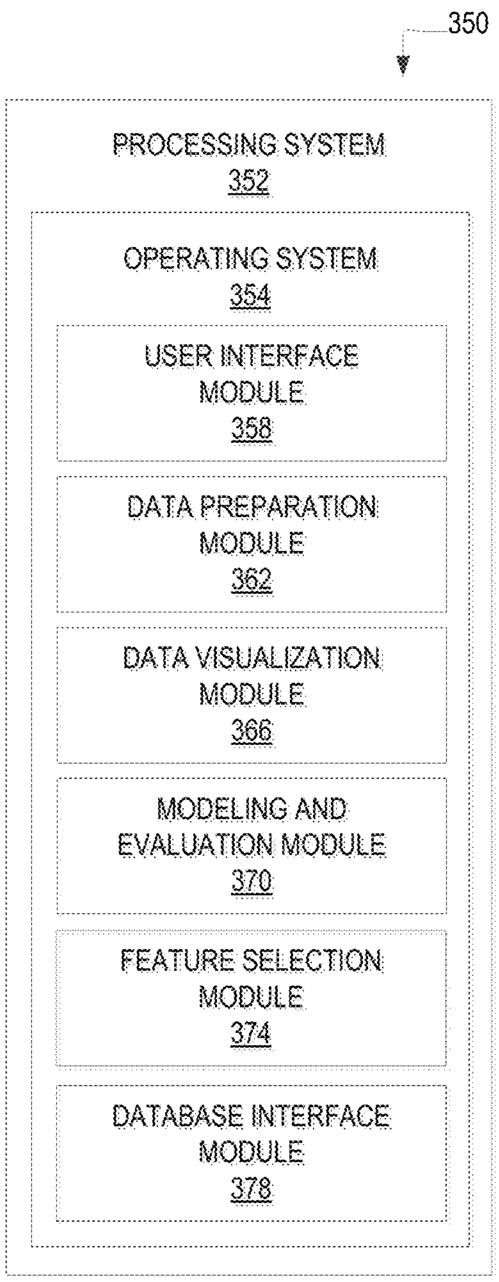
FIG. 3B is a block diagram of an example apparatus for generating a scoring model for prioritizing electronic communications, in accordance with an example embodiment.

FIG. 3B is a block diagram of an example apparatus 350 for generating a scoring model for prioritizing electronic communications, in accordance with an example embodiment. The apparatus 350 is shown to include a processing system 352 that may be implemented on a client or other processing device, and that includes an operating system 354 for executing software instructions.

In accordance with an example embodiment, the apparatus 350 may include a user interface module 358, a data preparation module 362, a data visualization module 366, a modeling and evaluation module 370, a feature selection module 374, and a database interface module 378.

The user interface module 358 enables a user to, for example, configure the data preparation module 362, the data visualization module 366, the modeling and evaluation module 370, and the feature selection module 374. The user interface module 358 enables a user to import a model generation data file, as described more fully below by way of example in conjunction with FIGS. 6A and 6B.

The data preparation module 362 imports and prepares historic data, such as data associated with past customer transactions and the lead information maintained by the lead service 116 and/or the leads database 120. The data visualization module 366 enables, for example, exploratory charts, graphs, and the like to be produced in order to visualize the historic data and to select an initial set of features and an initial model framework for consideration.

The modeling and evaluation module 370 performs regression runs to, for example, determine coefficients of a linear function of the model and to evaluate the effectiveness of the model. The feature selection module 374 enables the selection of the model features. The database interface module 378 enables a generated model to be stored in the statistical models database 130.

Figure 4:
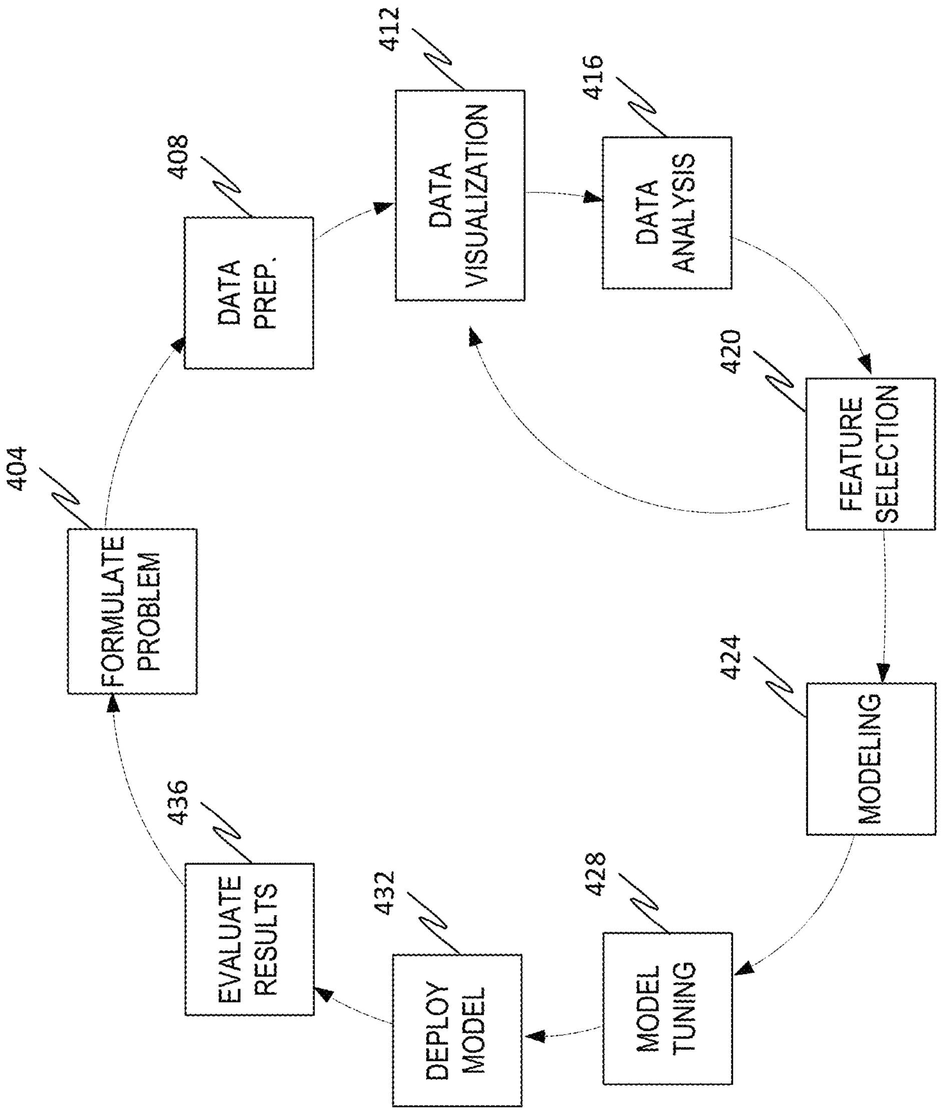
FIG. 4 illustrates a workflow for generating a scoring model for prioritizing electronic communications, in accordance with an example embodiment.

FIG. 4 illustrates a workflow for generating a scoring model for prioritizing electronic communications, in accordance with an example embodiment. In one example embodiment, one or more of the operations of the workflow 400 may be performed by the modeling and evaluation module 370 or the feature selection module 374.

In one example embodiment, the prioritization problem is formulated (operation 404). For example, the definition of a communication in terms of the stage of processing the call, the definition of conversion, transaction value, the hypothesized universe of statistical features that may be utilized in a model, are identified and performance metrics of a model, such as AUC (Area Under Curve) for binary predictions, and simulation results, are defined.

Historic data under the definitions of the formulated problem is prepared for visualization (operation 408) and visualized as charts, graphs, and the like (operation 412). The historic data may comprise data associated with past customer transactions and the lead information maintained by the lead service 116 and/or the leads database 120. The data associated with past customer transactions may include characteristics (features) of customers who have, for example, completed transactions in the past. Characteristics may include the customer's location, telephone number, age, and the like. The historic data may be used for selecting the model features and for generating the model. Exploratory charts, graphs, and the like may be produced to visualize the historic data and may be used to select an initial set of features and an initial model framework for consideration.

In one example embodiment, there are two categories of exploratory charts. The first category describes the distribution of a single variable in the population and sub groups through histograms, bar plots, box plots, and the like. The second category describes correlations among multiple variables through scatter plots, box plots, line charts, and the like. An example use of a chart in the first category is a bar plot that shows 80%+ of the data points distributed among three major categories, and the remaining 20% distributed among one hundred other categories. In this case, the data analyst may consider grouping the one hundred categories in the lower 20% to form a single category. An example use of charts in the second category is a scatter plot between an input feature and the output feature that turns out to fall along a line. In this case, the analyst can show that there is a strong linear relationship suggested and should consider including this input feature in the selected subset of features.

As described above, the exploratory charts, graphs, and the like in combination with the problem definition may be used to select the initial model framework, such as logistic regression. Logistic regression defines a format of a formula based on a family of available polynomials. In addition, the visualized data is analyzed (operation 416) and one or more proposed sets of features are selected for the initial model (operation 420). Feature selection may be based on stepwise regression, all possible regression, best subset regression, and the like, as described more fully above.

The selected formula is further defined by executing training algorithms using the historic data (training data) to define the values of the coefficients of the formula's polynomial (operation 424). In addition, special terms may be added to the polynomial to account for new products and services, as described more fully above. Further, the model can be compared in this step to a simulated consumer behavior and graded on its ability to predict simulated consumer behavior. In essence, the model predicts aggregate consumer behavior based on traits and characteristics. The ability to predict consumer behavior can be accomplished by testing the model in a production environment against actual consumer data. The ability to predict simulated consumer behavior can also be accomplished by holding back a portion of the training set and testing the model to determine if it accurately predicts the held back data. In one example embodiment, a simulation of consumer behavior is created and the model is used to predict behavior for the simulated consumer. If the simulation is "stable" (i.e., the predicted behavior using the held back data is stable and consistent with the predicted behavior using the training data), then the results of using the models are compared prior to release to production.

In one example embodiment, multiple models are created by repeating operation 408 using different formulas and different sets of features. One or more of the models may be selected (operation 424) for tuning (operation 428) based on the model performance metric defined in operation 404. For example, the scoring model may be applied to a set of test/training data and the results may be evaluated. The results and performance of the model may be compared to the results and performance of other scoring models. The set of selected models are then tuned using techniques such as pruning (for a tree-based model), ensemble theory, and the like. For example, if one model tends to predict more accurately on populations where another model tends to predict less accurately, a better prediction accuracy may be achieved by using ensemble theory to synthesize a new model out of the two previous models. In essence, the model framework, the model features, and the coefficients of the polynomial are selected based on iterative analysis which identify the best performing model(s).

Once the best scoring model has been tuned (operation 428), it may be deployed in the statistical models database 130 of FIG. 1 (operation 432). The trained model may then be used to process new incoming communications; the features characterizing the communication are processed using the trained model, and a score is generated. The results achieved by the scoring model in an operational environment may be monitored and evaluated in regard to, for example, the performance metrics defined during the problem formulation (operation 436).

Figure 5:
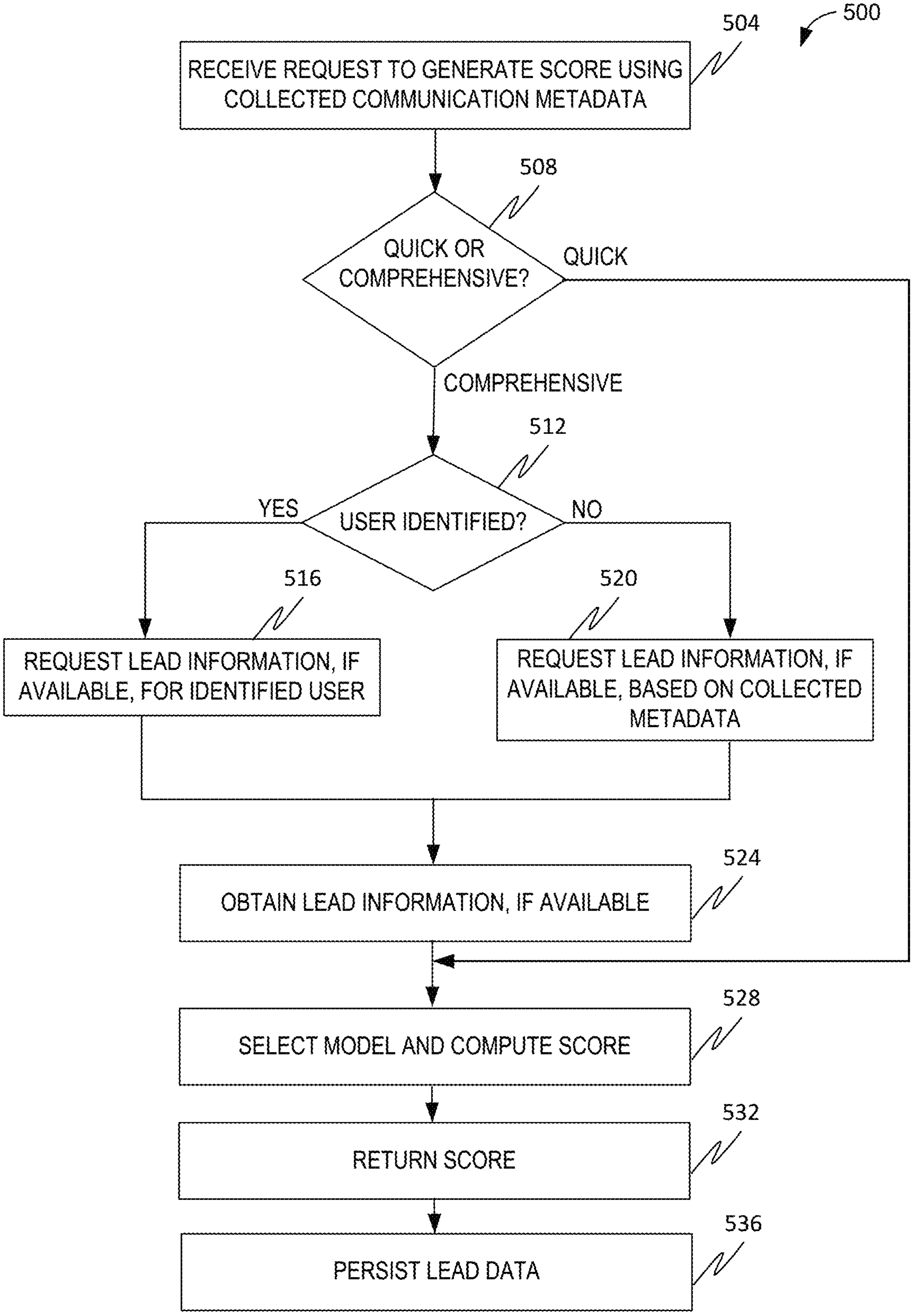
FIG. 5 is a flowchart of an example method for processing an incoming electronic communication, in accordance with an example embodiment.

FIG. 5 is a flowchart of an example method 500 for processing an incoming electronic communication, in accordance with an example embodiment. In one example embodiment, the method 500 is executed by the lead scoring service 112.

In one example embodiment, a request to generate a score is received (operation 504). The request includes a portion of the metadata collected by, for example, the communication processing system 108 and an indication of whether a quick score or a comprehensive score is to be generated. A test is performed to determine if a quick or comprehensive score is requested (operation 508).

If a quick score is requested, the method 500 proceeds with operation 528. If a comprehensive score is requested, a determination is made as to whether an identification of the user associated with the communication can be made (operation 512). For example, a user's telephone number, social security number, name, location, and the like may be used to determine an identity of the user. The information used to determine the identity of the user at execution time may be configured by a user, consistent with applicable law. If the user's identity has been determined, a request for lead information regarding the identified user is issued (operation 516); otherwise, a request for lead information based on the collected metadata is issued (operation 520). The request may be issued to, for example, the lead service 116 or directly to the leads database 120. In one example embodiment, the determination of the user's identity is simply made by the lead service 116 and the method 500 bypasses operations 512-520 and proceeds directly to operation 524.

Lead information, if available, is obtained (operation 524). The lead information, if available, and the collected metadata are parsed to extract the feature data used by the scoring model. The score is calculated using the formula of the model based on the selected score type (quick or comprehensive) and the extracted feature data (operation 528). The generated score is then returned to, for example, the communication processing system 108 (operation 532). In one example embodiment, a compound score comprising multiple quick or comprehensive scores are generated using multiple models during operation 528 and the compound score is returned during operation 532. For example, a market basket of goods may be individually scored for a propensity to purchase, where the probability of purchasing apples is 30%, the probability of purchasing meat is 20%, and the probability of purchasing broccoli is 60%. Assuming the cost of an apple is $0.50, the cost of meat is $2.00, and the cost of broccoli is $1.00, then the aggregate value of these purchases is approximately $1.15 (i.e., 0.30*0.50+0.20*2.00+0.60*1.00).

In one example embodiment, the lead is persisted to the leads database 120 if the lead is a new lead or an existing lead that has been modified (operation 536).

FIGS. 6A and 6B are a representation of an example data file 600 for specifying parameters of a scoring model, in accordance with an example embodiment. The data file 600 comprises a coefficients section for each product, service, advertising channel, and the like. Each coefficients section comprises a name 608, a value 612, and a coefficient definition section 604 for each feature. Each coefficient definition section 604 comprises an input identifier 616 and a coefficient 620 for each value 624 of the corresponding feature.

A special factor 628, such as a cost of acquisition, can also be defined. The special factor 628 may be an additional term of the model equation for predicting the score of a customer. For example, the cost of acquisition may be subtracted from the initial customer score.

A detailed near term value 632 may also be provided. As described above, a final score can be adjusted to account for a cost of acquisition, a partner goodwill, and the like. As illustrated in FIG. 6B, the cost of acquisition of a product or service may be provided and subtracted from the generated score to generate the final score.

An alternate score section 636 may be used to map a score to an alternate value. For example, if scores generated by the scoring model range from 0 to 1,000, and the communication processing system 108 only handles scores from one to three, the score may be linearly mapped from a range of 0 to 1,000 to a range of one to three.

A model version 640 assigns a name or other identifier that may be used to index the scoring model in the statistical models database 128.

Although certain examples are shown and described here, other variations exist and are within the scope of the invention. It will be appreciated, by those of ordinary skill in the art, that any arrangement, which is designed or arranged to achieve the same purpose, may be substituted for the specific embodiments shown. This application is intended to cover any adaptations or variations of the example embodiments of the invention described herein. It is intended that this invention be limited only by the claims, and the full scope of equivalents thereof.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field-programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through the network 115. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
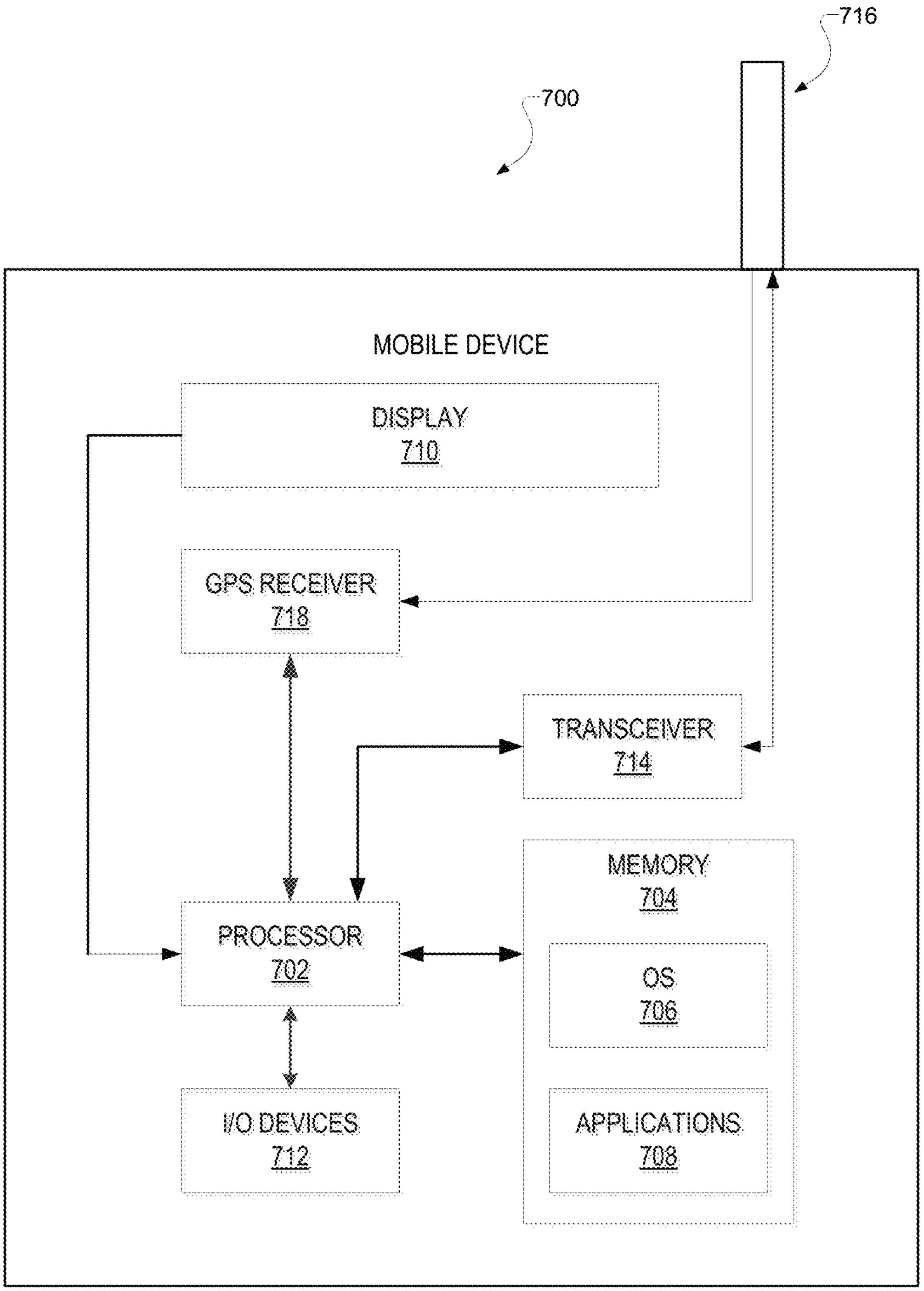
FIG. 7 is a block diagram illustrating a mobile device, according to an example embodiment.

FIG. 7 is a block diagram illustrating a mobile device 700, according to an example embodiment. The mobile device 700 can include a processor 702. The processor 702 can be any of a variety of different types of commercially available processors suitable for mobile devices 700 (for example, an XScale architecture microprocessor, a microprocessor without interlocked pipeline stages (MIPS) architecture processor, or another type of processor). A memory 704, such as a random access memory (RAM), a flash memory, or another type of memory, is typically accessible to the processor 702. The memory 704 can be adapted to store an operating system (OS) 706, as well as applications 708, such as a mobile location-enabled application that can provide location-based services (LBSs) to a user. The processor 702 can be coupled, either directly or via appropriate intermediary hardware, to a display 710 and to one or more input/output (I/O) devices 712, such as a keypad, a touch panel sensor, and a microphone. Similarly, in some embodiments, the processor 702 can be coupled to a transceiver 714 that interfaces with an antenna 716. The transceiver 714 can be configured to both transmit and receive cellular network signals, wireless data signals, or other types of signals via the antenna 716, depending on the nature of the mobile device 700. Further, in some configurations, a GPS receiver 718 can also make use of the antenna 716 to receive GPS signals.

Figure 8:
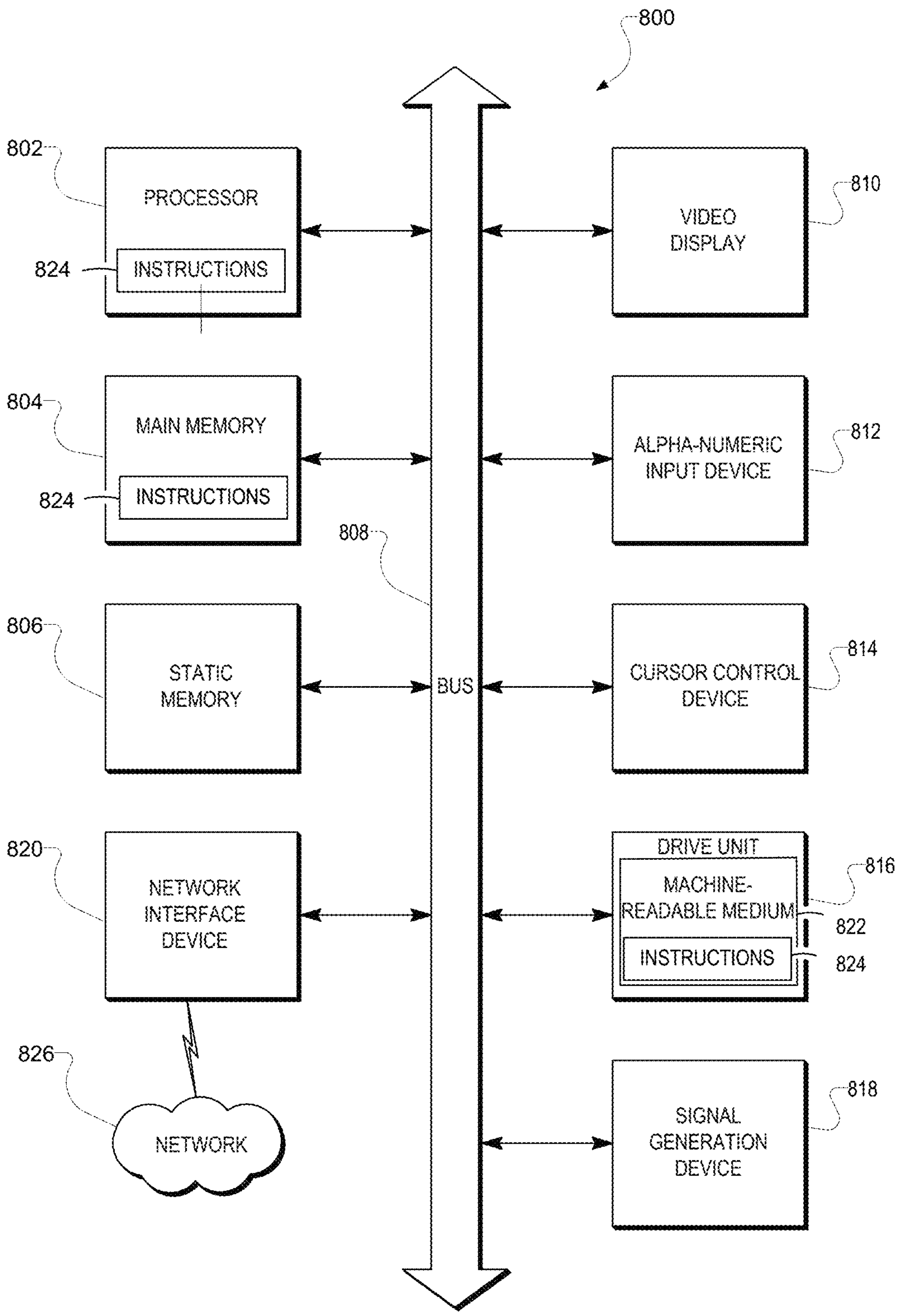
FIG. 8 is a block diagram of a machine within which instructions may be executed for causing the machine to perform any one or more of the methodologies discussed herein.

FIG. 8 is a block diagram of a machine in the form of an example computer system 800 within which instructions may be executed for causing the machine to perform any one or more of the methodologies discussed herein. In one example embodiment, the machine may be the example apparatus 300 of FIG. 3A for prioritizing communications, the example apparatus 350 of FIG. 3B, or both. In alternative embodiments, the machine 800 operates as a standalone device or may be connected (e.g., networked) to other machines. In a networked deployment, the machine 800 may operate in the capacity of a server or a client machine in a server-client network environment, or as a peer machine in a peer-to-peer (or distributed) network environment. The machine 800 may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine 800. Further, while only a single machine 800 is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a cursor control device 814 (e.g., a mouse), a drive unit 816, a signal generation device 818 (e.g., a speaker), and a network interface device 820.

Machine-Readable Medium

The drive unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media. The instructions 824 may also reside within the static memory 806 (not shown).

While the machine-readable medium 822 is shown, in an example embodiment, to be a single medium, the term "machine-readable medium" may include a single medium or multiple media (e.g., a centralized or distributed database, and/or associated caches and servers) that store the one or more data structures or instructions 824. The term "machine-readable medium" shall also be taken to include any tangible medium that is capable of storing, encoding, or carrying instructions 824 for execution by the machine 800 and that cause the machine 800 to perform any one or more of the methodologies of the present invention, or that is capable of storing, encoding, or carrying data structures utilized by or associated with such instructions 824. The term "machine-readable medium" shall accordingly be taken to include, but not be limited to, solid-state memories, and optical and magnetic media. Specific examples of machine-readable media 822 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. The machine readable medium 822 specifically excludes signals per se.

Transmission Medium

The instructions 824 may further be transmitted or received over a communications network 826 using a transmission medium. The instructions 824 may be transmitted using the network interface device 820 and any one of a number of well-known transfer protocols (e.g., Hypertext Transfer Protocol (HTTP)). Examples of communication networks 826 include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 824 for execution by the machine 800, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments.

Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system for prioritizing electronic communications, the system comprising:

a communications processing system comprising one or more hardware processors, the communications processing system maintaining a queue of electronic communications; and a lead scoring service in communication with the communications processing system, the lead scoring service comprising one or more hardware processors, the system being programmed to perform operations comprising:

receiving, by the lead scoring service, an indication of a first incoming electronic communication received by the communications processing system;

determining, by the lead scoring service, to perform a quick evaluation of the first incoming electronic communication, the determining based at least in part on a first available capacity of the lead scoring service when the first incoming electronic communication is received;

obtaining, by the lead scoring service, metadata that characterizes the first incoming electronic communication;

performing, by the lead scoring service, the quick evaluation of the first incoming electronic communication, the performing of the quick evaluation comprising:

applying, by the lead scoring service, machine learning to the metadata to generate a plurality of scoring models;

selecting, by the lead scoring service, a scoring model for the first incoming electronic communication from the plurality of scoring models, the selecting based on at least one characteristic of the first incoming electronic communication; and generating, by the lead scoring service, a score for the first incoming electronic communication using the scoring model, the generating based on a propensity of the first incoming electronic communication to result in a purchase and a value of the purchase;

inserting, by the communications processing system, the first incoming electronic communication into the queue of electronic communications at a position based on the score for the first incoming electronic communication;

receiving, by the lead scoring service, an indication of a second incoming electronic communication;

obtaining, by the lead scoring service, metadata that characterizes the second incoming electronic communication;

determining, by the lead scoring service, to perform a comprehensive evaluation of the second incoming electronic communication, the determining based at least in part on a second available capacity of the lead scoring service when the second incoming electronic communication is received, the second available capacity being greater than the first available capacity;

performing, by the lead scoring service, the comprehensive evaluation of the second incoming electronic communication, the performing of the comprehensive evaluation comprising:

identifying, by the lead scoring service, a user associated with the second incoming electronic communication;

accessing, by the lead scoring service, lead information corresponding to the user associated with the second incoming electronic communication;

selecting, by the lead scoring service, a scoring model for the second incoming electronic communication from the plurality of scoring models; and generating, by the lead scoring service, a score for the second incoming electronic communication using the scoring model, the metadata that characterizes the second incoming electronic communication, and the lead information corresponding to the user associated with the second incoming electronic communication; and inserting, by the communications processing system, the second incoming electronic communication into the queue of electronic communications at a position based on the score for the second incoming electronic communication.

2. The system of claim 1, wherein the metadata comprises a caller identifier and the operations further comprise mapping the caller identifier to a location.

3. The system of claim 1, wherein the score is based on a recipient identifier.

4. The system of claim 3, wherein the recipient identifier is a telephone number called, an email address, or an Internet Protocol address.

5. The system of claim 1, wherein the score has a score type and the score type is based on a type of the first incoming electronic communication, a machine learning model, or a set of statistical features.

6. The system of claim 1, wherein the score is based on an estimated revenue, an estimated profit, an estimated profit margin, or a probability of selecting a specified product type.

7. The system of claim 1, the operations further comprising generating the score based on an estimated revenue multiplied by the propensity of the first incoming electronic communication to result in a purchase.

8. The system of claim 2, wherein the location is identified by a county or a zip code area.

9. The system of claim 2, wherein the location is associated with a customer whose probability to complete a transaction is greater than a threshold value.

10. The system of claim 1, the operations further comprising selecting a subset of features for use in generating the score and training the scoring model utilizing the selected subset of features to predict at least a part of the score.

11. The system of claim 1, wherein the scoring model is a linear model, a logistic model, a random forest model, or a support vector machine model.

12. The system of claim 1, wherein a formula of the scoring model includes a term to rank a new product, a new service or a new advertising channel within a predefined range, the predefined range based on an aggregate mean of the scoring model.

13. The system of claim 1, the operations further comprising processing sparse training data associated with a product, a service, or an advertising channel with other sparse training data associated with another product, another service, or another advertising channel, the sparse training data characterized by an amount of training data being below a statistically significant amount, the processing being one or more of combining, extrapolating, and simulating.

14. The system of claim 1, the operations further comprising modifying the scoring model to incorporate an additional polynomial term corresponding to a new product, a new service, or a new advertising channel.

15. The system of claim 1, the operations further comprising dynamically selecting the scoring model at runtime.

16. The system of claim 15, the dynamic selection allowing for a plurality of scoring models to be used based on a communication type, a customer type, a selected score type, or a selected score outcome.

17. The system of claim 1, wherein the model is a logistics model used to predict a propensity of a customer to purchase a product.

18. The system of claim 17, wherein inputs for the prediction are a telephone number associated with a customer and a telephone number called by a customer.

19. The system of claim 1, wherein the score is resultant from an amalgamation of multiple models.

20. A computer-implemented method for prioritizing electronic communications, the method comprising:

receiving, by a lead scoring service, an indication of a first incoming electronic communication, the lead scoring service comprising one or more hardware processors;

determining, by the lead scoring service, to perform a quick evaluation of the first incoming electronic communication, the determining based at least in part on a first available capacity of a lead scoring service when the first incoming electronic communication is received;

obtaining, by the lead scoring service, metadata that characterizes the first incoming electronic communication;

performing, by the lead scoring service, the quick evaluation of the first incoming electronic communication, the performing of the quick evaluation comprising:

applying machine learning, by a lead scoring service, to the metadata to generate a plurality of scoring models;

selecting, by the lead scoring service, a scoring model for the first incoming electronic communication from the plurality of scoring models, the selecting based on at least one characteristic of the first incoming electronic communication; and generating, by the lead scoring service, a score for the first incoming electronic communication using the scoring model, the generating based on a propensity of the first incoming electronic communication to result in a purchase and a value of the purchase;

inserting, by a communications processing system, the first incoming electronic communication into a queue of electronic communications at a position based on the score for the first incoming electronic communication, the queue of electronic communications being maintained by the communications processing system, the communications processing system comprising at least one processor and being in communication with the lead scoring service;

receiving, by the lead scoring service, an indication of a second incoming electronic communication;

obtaining, by the lead scoring service, metadata that characterizes the second incoming electronic communication;

determining, by the lead scoring service, to perform a comprehensive evaluation of the second incoming electronic communication, the determining based at least in part on a second available capacity of the lead scoring service when the second incoming electronic communication is received, the second available capacity being greater than the first available capacity;

performing, by the lead scoring service, the comprehensive evaluation of the second incoming electronic communication, the performing of the comprehensive evaluation comprising:

identifying, by the lead scoring service, a user associated with the second incoming electronic communication;

accessing, by the lead scoring service, lead information corresponding to the user associated with the second incoming electronic communication;

selecting, by the lead scoring service, a scoring model for the second incoming electronic communication from the plurality of scoring models; and generating, by the lead scoring service, a score for the second incoming electronic communication using the scoring model, the metadata that characterizes the second incoming electronic communication, and the lead information corresponding to the user associated with the second incoming electronic communication; and inserting, by the communications processing system, the second incoming electronic communication into the queue of electronic communications at a position based on the score for the second incoming electronic communication.

21. The computer-implemented method of claim 20, wherein the metadata comprises a caller identifier and further comprising mapping the caller identifier to a location.

22. The computer-implemented method of claim 20, wherein the score is based on a recipient identifier.

23. The computer-implemented method of claim 22, wherein the recipient identifier is a telephone number called, an email address, or an Internet Protocol address.

24. The computer-implemented method of claim 20, wherein the score has a score type and the score type is based on a type of the first incoming electronic communication, a machine learning model, or a set of statistical features.

25. The computer-implemented method of claim 20, wherein the score is based on an estimated revenue, an estimated profit, an estimated profit margin, or a probability of selecting a specified product type.

26. The computer-implemented method of claim 20, further comprising generating the score based on an estimated revenue multiplied by the propensity of the first incoming electronic communication to result in a purchase.

27. The computer-implemented method of claim 21, wherein the location is identified by a county or a zip code area.

28. The computer-implemented method of claim 21, wherein the location is associated with a customer whose probability to complete a transaction is greater than a threshold value.

29. The computer-implemented method of claim 20, further comprising selecting a subset of features for use in generating the score and training the scoring model utilizing the selected subset of features to predict at least a part of the score.

30. The computer-implemented method of claim 20, wherein the scoring model is a linear model, a logistic model, a random forest model, or a support vector machine model.

31. The computer-implemented method of claim 20, wherein a formula of the scoring model includes a term to rank a new product, a new service or a new advertising channel within a predefined range, the predefined range based on an aggregate mean of the scoring model.

32. The computer-implemented method of claim 20, further comprising processing sparse training data associated with a product, a service, or an advertising channel with other sparse training data associated with another product, another service, or another advertising channel, the sparse training data characterized by an amount of training data being below a statistically significant amount, the processing being one or more of combining, extrapolating, and simulating.

33. The computer-implemented method of claim 20, further comprising modifying the scoring model to incorporate an additional polynomial term corresponding to a new product, a new service, or a new advertising channel.

34. The computer-implemented method of claim 20, further comprising dynamically selecting the scoring model at runtime.

35. The computer-implemented method of claim 34, the dynamic selection allowing for a plurality of scoring models to be used based on a communication type, a customer type, a selected score type, or a selected score outcome.

36. The computer-implemented method of claim 20, wherein the model is a logistics model used to predict a propensity of a customer to purchase a product.

37. The computer-implemented method of claim 36, wherein inputs for the prediction are a telephone number associated with a customer and a telephone number called by a customer.

38. The computer-implemented method of claim 20, wherein the score is resultant from an amalgamation of multiple models.

39. A non-transitory machine-readable storage medium comprising instructions that, when executed by one or more processors of a machine, cause the machine to perform operations comprising:

receiving, by a lead scoring service, an indication of a first incoming electronic communication, the lead scoring service comprising one or more hardware processors;

determining, by the lead scoring service, to perform a quick evaluation of the first incoming electronic communication, the determining based at least in part on a first available capacity of a lead scoring service when the first incoming electronic communication is received;

performing, by the lead scoring service, the quick evaluation of the first incoming electronic communication, the performing of the quick evaluation comprising:

obtaining, by the lead scoring service, metadata that characterizes the first incoming electronic communication;

applying, by the lead scoring service, machine learning to the metadata to generate a plurality of scoring models;

selecting, by the lead scoring service, a scoring model for the first incoming electronic communication from the plurality of scoring models, the selecting based on at least one characteristic of the first incoming electronic communication; and generating, by the lead scoring service, a score for the first incoming electronic communication using the scoring model, the generating based on a propensity of the incoming electronic communication to result in a purchase and a value of the purchase;

inserting, by a communications processing system, the first incoming electronic communication into a queue of electronic communications at a position based on the score for the first incoming electronic communication, the queue of electronic communications being maintained by the communications processing system, the communications processing system comprising at least one processor and being in communication with the lead scoring service;

receiving, by the lead scoring service, an indication of a second incoming electronic communication;

obtaining, by the lead scoring service, metadata that characterizes the second incoming electronic communication;

determining, by the lead scoring service, to perform a comprehensive evaluation of the second incoming electronic communication, the determining based at least in part on a second available capacity of the lead scoring service when the second incoming electronic communication is received, the second available capacity being greater than the first available capacity;

performing, by the lead scoring service, the comprehensive evaluation of the second incoming electronic communication, the performing of the comprehensive evaluation comprising:

identifying, by the lead scoring service, a user associated with the second incoming electronic communication;

accessing, by the lead scoring service, lead information corresponding to the user associated with the second incoming electronic communication;

selecting, by the lead scoring service, a scoring model for the second incoming electronic communication from the plurality of scoring models;

generating, by the lead scoring service, a score for the second incoming electronic communication using the scoring model, the metadata that characterizes the second incoming electronic communication, and the lead information corresponding to the user associated with the second incoming electronic communication; and inserting, by the communications processing system, the second incoming electronic communication into the queue of electronic communications at a position based on the score for the second incoming electronic communication.

40. The non-transitory machine-readable storage medium of claim 39, wherein the metadata comprises a caller identifier and the operations further comprise mapping the caller identifier to a location.

41. The non-transitory machine-readable storage medium of claim 39, wherein the score is based on a recipient identifier.

42. The non-transitory machine-readable storage medium of claim 41, wherein the recipient identifier is a telephone number called, an email address, or an Internet Protocol address.

43. The non-transitory machine-readable storage medium of claim 39, wherein the score has a score type and the score type is based on a type of the first incoming electronic communication, a machine learning model, or a set of statistical features.

44. The non-transitory machine-readable storage medium of claim 39, wherein the score is based on an estimated revenue, an estimated profit, an estimated profit margin, or a probability of selecting a specified product type.

45. The non-transitory machine-readable storage medium of claim 39, the operations further comprising generating the score based on an estimated revenue multiplied by the propensity of the first incoming electronic communication to result in a purchase.

46. The non-transitory machine-readable storage medium of claim 40, wherein the location is identified by a county or a zip code area.

47. The non-transitory machine-readable storage medium of claim 40, wherein the location is associated with a customer whose probability to complete a transaction is greater than a threshold value.

48. The non-transitory machine-readable storage medium of claim 39, the operations further comprising selecting a subset of features for use in generating the score and training the scoring model utilizing the selected subset of features to predict at least a part of the score.

49. The non-transitory machine-readable storage medium of claim 39, wherein the scoring model is a linear model, a logistic model, a random forest model, or a support vector machine model.

50. The non-transitory machine-readable storage medium of claim 39, wherein a formula of the scoring model includes a term to rank a new product, a new service or a new advertising channel within a predefined range, the predefined range based on an aggregate mean of the scoring model.

51. The non-transitory machine-readable storage medium of claim 39, the operations further comprising processing sparse training data associated with a product, a service, or an advertising channel with other sparse training data associated with another product, another service, or another advertising channel, the sparse training data characterized by an amount of training data being below a statistically significant amount, the processing being one or more of combining, extrapolating, and simulating.

52. The non-transitory machine-readable storage medium of claim 39, the operations further comprising modifying the scoring model to incorporate an additional polynomial term corresponding to a new product, a new service, or a new advertising channel.

53. The non-transitory machine-readable storage medium of claim 39, the operations further comprising dynamically selecting the scoring model at runtime.

54. The non-transitory machine-readable storage medium of claim 53, the dynamic selection allowing for a plurality of scoring models to be used based on a communication type, a customer type, a selected score type, or a selected score outcome.

55. The non-transitory machine-readable storage medium of claim 39, wherein the model is a logistics model used to predict a propensity of a customer to purchase a product.

56. The non-transitory machine-readable storage medium of claim 55, wherein inputs for the prediction are a telephone number associated with a customer and a telephone number called by a customer.

57. The non-transitory machine-readable storage medium of claim 39, wherein the score is resultant from an amalgamation of multiple models.

* * * * *